United States Patent [19]

Servais

[11] Patent Number: 4,981,720

[45] Date of Patent: Jan. 1, 1991

[54] METHOD OF MANUFACTURING COOPER MIRRORS

[75] Inventor: Albert Servais, Loverval, Belgium

[73] Assignee: Glaverbel, Brussels, Belgium

[21] Appl. No.: 210,013

[22] Filed: Jun. 22, 1988

[30] Foreign Application Priority Data

Jun. 23, 1987 [GB] United Kingdom ............ 8714666

[51] Int. Cl.$^5$ .............................................. B05D 5/06
[52] U.S. Cl. .................................. 422/168; 427/305; 427/424; 427/426; 427/427
[58] Field of Search ............... 427/165, 168, 305, 424, 427/426, 427

[56] References Cited

U.S. PATENT DOCUMENTS

| 2,977,244 | 3/1961 | Kay et al. | 427/168 |
| 3,993,845 | 11/1976 | Greenberg et al. | 427/168 |
| 4,255,214 | 3/1981 | Workens | 427/168 |

FOREIGN PATENT DOCUMENTS

| 0158890 | 10/1985 | European Pat. Off. . |
| 1509946 | 5/1978 | United Kingdom . |
| 2154251 | 9/1985 | United Kingdom . |
| 2164063 | 3/1986 | United Kingdom . |

Primary Examiner—Janyce Bell
Attorney, Agent, or Firm—Spencer & Frank

[57] ABSTRACT

A method of manufacturing a mirror, including forming on a transparent glass sheet a copper reflective layer by chemical deposition from contact with a coppering solution; and coating the copper reflective layer with at least one protective layer effective to protect the copper reflective layer from corrosion by the atmosphere, wherein the copper reflective layer is formed under conditions effective to provide a mirror which, after having been subjected to a CASS Test for 120 hours, has a factor of luminous reflection which is at least 0.90 times what is was before the mirror was subjected to the CASS Test. The method may include the further steps of coating the transparent glass sheet prior to forming the copper reflective layer thereon with a sequestering solution, which sequestering solution sequesters reaction products of the coppering solution, to provide a wetted glass sheet; coating the wetted glass sheet with the coppering solution while the wetted glass sheet is still wet with the sequestering solution to thereby improve the mirror's resistance to aging; and rinsing the transparent glass sheet with water.

8 Claims, 3 Drawing Sheets 4,981,720

1

METHOD OF MANUFACTURING COOPER MIRRORS

FIELD OF THE INVENTION

This invention relates to a mirror comprising a transparent glass sheet bearing a copper reflective layer and at least one protective layer, and to a method of manufacturing a mirror comprising forming on a transparent glass sheet a copper reflective layer and at least one protective layer.

TECHNOLOGY REVIEW

Mirrors bearing a silver reflective coating are of course extremely well known. Such mirrors in general have a neutral tint in reflection, that is, they do not appreciably modify the colour of light which they reflect. It is occasionally desired to make use of a mirror which does modify the colour of the light it reflects. This effect could be achieved by using coloured glass for forming a silver mirror, but a more usual course is to make use of a reflective layer which colours the reflected light. A gold reflective layer deposited on a clear transparent support imparts a tone to reflected light which is thought by many to be aesthetically pleasing.

Known methods of depositing a reflective layer of gold on a transparent support tend to be rather expensive, and gold is itself a costly material. Various proposals have therefore been made to mimic the appearance of a gold mirror by manufacturing a copper mirror, that is, a mirror with a reflective layer of copper. Copper as a material is less costly than gold, and it can readily be deposited by chemical methods as opposed to the more expensive vacuum deposition or sputtering techniques.

Unfortunately, a copper reflective film has the disadvantage of being rather easily corroded by the atmosphere, and particularly by pollutants such as sulphur dioxide, despite the presence of a protective layer for example of paint. As a result, the thin reflective layer of a copper mirror discolours (blackens) in the course of a fairly short time. This is of course quite unacceptable to the user.

This problem has received much attention in the past, and various proposals have been made to protect a reflective copper film against discoloration by applying various protective materials in efforts to prevent or retard atmospheric corrosion. To date, the most effective of these proposals has been to treat the copper layer with substituted azole. Such proposals are for example set out in British patent specifications Nos. 1,074,076 (Pittsburgh Plate Glass Co.), 1,250,142 (Shikoku Kasei Kogyo Co. Ltd) and 2,102,453 (Glaverbel), and in U.S. patent specification No. 4,255,214 (Falconer Plate Glass Corp). A said protective layer may thus comprise a superficial stratum of the copper layer which has been contacted by azole. While such azole protection is undoubtedly beneficial in retarding corrosion of copper films and enables formation of the best chemically deposited copper mirrors hitherto available, it has been found that even azole protected copper films may change in aspect and also that during fabrication of the mirror, even in a short time before a substituted azole is applied to the mirror, changes in aspect are observed. It is for this reason that copper mirrors have hitherto been difficult to market on a commercial scale.

An indication of the resistance to aging of a mirror incorporating a metallic film can be given by subjecting it to a copper-accelerated acetic acid salt spray test known as the CASS Test in which the mirror is placed in a testing chamber at 50° C. and is subjected to the action of a fog formed by spraying an aqueous solution containing 50 g/L sodium chloride, 0.2 g/L anhydrous cuprous chloride with sufficient glacial acetic acid to bring the pH of the sprayed solution to between 3.0 and 3.1. Full details of this test are set out in International Standard ISO 3770-1976. Mirrors may be subjected to the action of the saline fog for different lengths of time, whereafter the reflective properties of the artificially aged mirror may be compared with the reflective properties of the freshly formed mirror. We find that an exposure time of 120 hours or longer gives a useful indication of the resistance of a copper mirror to aging.

SUMMARY OF THE INVENTION

It is an object of this invention to provide a copper mirror which has a useful and commercially acceptable service life.

According to the present invention, there is provided a mirror comprising a transparent glass sheet bearing a copper reflective layer and at least one protective layer, characterised in that said copper layer is a chemically deposited layer such that after the mirror has been subjected to the CASS Test for 120 hours, the factor of luminous reflection of the mirror is at least 0.9 times what it was before the mirror was subjected to that test.

Copper mirrors according to the invention as above defined have a significantly improved useful life. The invention thus provides copper mirrors which can be exploited on a commercial scale. Clearly it is important to protect such a copper layer as effectively as possible, for example by means of an azole treatment and by painting, as known per se, so that the copper layer is protected against atmospheric attack by a more or less impermeable barrier.

DETAILED DESCRIPTION OF THE INVENTION

Figure 1:
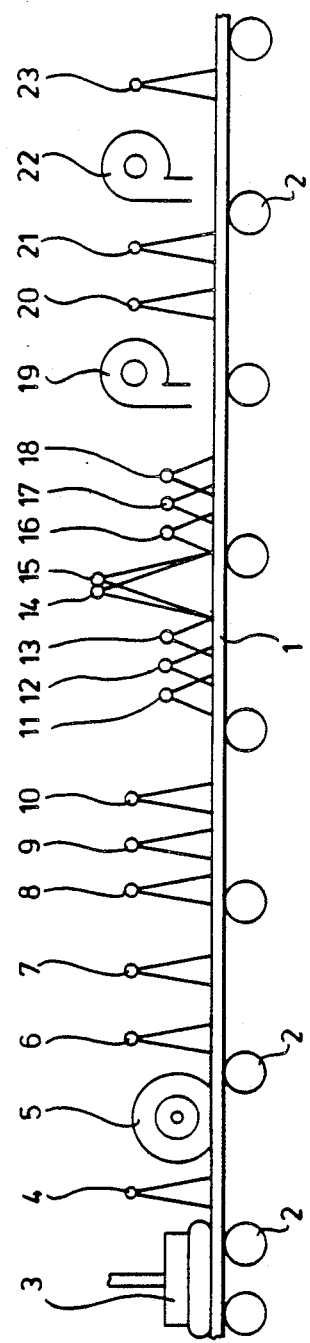
FIG. 1 is a schematic view of apparatus for forming a mirror in accordance with the invention.

The present invention is based on our appreciation of the fact that while protection from atmospheric attack is of undoubted importance in the manufacture of a copper mirror with a useful service life, there is another very important factor which has not hitherto been taken into account. We have discovered that the way in which the copper layer is first formed has a significant effect on the aging properties and thus on the useful life of a copper mirror. We have found that it is extremely important to ensure that the protected copper layer does not itself already contain extraneous materials such as will react with the copper over the course of time to discolour the mirror. This is not to say that the copper layer must necessarily be wholly free of oxygen or other materials. Indeed we have found that a small oxygen content in the copper layer can be beneficial for achieving certain colouring effects which are considered desirable.

In preferred embodiments of the invention, therefore, the copper layer is a chemically deposited layer having a content of oxygen (if any) which is sufficiently low that after the mirror has been subjected to the CASS Test for 120 hours, the factor of luminous reflection of the mirror is at least 0.9 times what it was before the mirror was subjected to that test.

Advantageously, said copper layer is such that after the mirror has been subjected to the CASS Test for 120 hours, the said factor of luminous reflection is at least 0.98 times what it was before the mirror was subjected to that test, and most preferably, said copper layer is such that after the mirror has been subjected to the CASS Test for 250 hours, the said factor of luminous reflection is at least 0.98 times what it was before the mirror was subjected to that test. Satisfaction of one or both of these criteria is a good indication that a mirror will have an even more prolonged useful life.

In preferred embodiments of the invention, incident white light (C.I.E. [Commission Internationale d'Eclairage-International Commission on Illumination] Illuminant C) is reflected by the mirror with a dominant visible wavelength in the range 585 nm. to 590 nm. Such mirrors present an appearance very similar to known mirrors of which the reflective layer is of gold, while being very much less expensive to produce. Such mirrors can also have a useful life at least as great as that of gold mirrors.

It is noted here that azole protected mirrors have been made in accordance with this invention such that after the mirror has been subjected to the CASS Test for 120 hours, the said factor of luminous reflection is about 0.99 times what it was before the mirror was subjected to that test.

By way of comparison, the following may be cited. A mirror made in the same way but without any azole protection of its copper layer had its factor of luminous reflection reduced to about 75% of a datum value, being the factor of luminous reflection of that mirror before it was subjected to that test. A mirror of which the copper layer had been chemically deposited without any consideration as to its oxygen content or as to conditions during deposition had its factor of luminous reflection reduced to about 85% of that datum value during its manufacture, even before the protective azole could be applied. This comparison indicates that the manner in which the copper layer is formed is nearly as important as affording the reflective copper layer with the best known protection after it has been formed.

The present invention extends to a method of manufacturing such a mirror, and accordingly provides a method of manufacturing a mirror comprising forming on a transparent glass sheet a copper reflective layer and covering it with at least one protective layer, characterised in that said copper layer is formed by chemical deposition under such conditions that after the mirror has been subjected to the CASS Test for 120 hours, the factor of luminous reflection of the mirror is at least 0.90 times what it was before the mirror was subjected to that test.

Methods according to the invention result in the formation of mirrors which have acceptable aging properties and acceptable colour in reflection, and which are thus of use in commerce.

Hitherto, efforts to find a method of manufacturing commercially acceptable copper mirrors have concentrated on taking steps to protect the copper layer from external attack after it has been formed. What has not been appreciated hitherto is that the way in which the copper reflective layer is formed is also very important in achieving a mirror with acceptable aging properties.

In the most preferred embodiments of the invention, the glass sheet is sprayed with coppering solution while the glass is still wet following spraying with a coating reaction product sequestering solution, whereafter the glass is sprayed with water. This has the advantage of ensuring that the copper layer is formed with a very low, and perhaps even a substantially zero, content of oxygen. Thus the layer is formed in such a way that it does not already contain extraneous oxygen in such quantities as could react adversely with the copper in course of time to discolour the mirror.

This is of great practical importance, and in a second aspect of the invention, there is provided a method of manufacturing a mirror comprising forming on a transparent sheet a copper reflective layer and at least one protective layer, characterised in that for forming said copper layer, the glass sheet is sprayed with coppering solution while the glass is still wet following spraying with a coating reaction product sequestering solution, whereafter the glass is sprayed with water.

Operating according to the said most preferred embodiments of the first aspect of the method of the invention, or according to the second aspect of the method of the invention, ensures that the coppering reactions take place in the presence of a coating reaction product sequestering solution, and this has the effect of rendering the coating reaction products harmless to the deposited layer of metallic copper. As a result, we believe, the coating does not itself contain pollutants in such amounts as to have a significant adverse effect on its aging properties.

We have found that a most effective method of depositing a copper reflective layer is one in which the glass is transported past successive spraying stations where it is sprayed respectively with said sequestering solution, said coppering solution and water, and wherein a zone of impingement of the coppering solution occupies the substantially the full distance between a zone of impingement of the sprayed sequestering solution and a zone of impingement of sprayed water, and the adoption of this feature is accordingly preferred. This is a very effective way of forming a copper layer containing very little or no oxygen.

In the most preferred embodiments of the invention, said reaction product sequestering solution comprises an ammonium compound. Ammonium hydroxide solution is a very effective sequestering material. It is surprising that such solutions should be used even in embodiments of the invention where ammonium hydroxide solution is sprayed close to the zone of impingement of the coppering solution, because it is known that ammonium hydroxide can redissolve the metallic copper which will be formed in the coating reaction.

Preferably, such ammonium solution has a pH of at least 10.

Advantageously, in embodiments of the second aspect of the invention, said copper layer is formed under such conditions that after the mirror has been subjected to the CASS Test for 120 hours, the factor of luminous reflection of the mirror is at least 0.90 times what it was before the mirror was subjected to that test.

Preferably, said copper layer is formed in such manner that after the mirror has been subjected to the CASS Test for 120 hours, the said factor of luminous reflection is at least 0.98 times what it was before the mirror was subjected to that test, and advantageously, said copper layer is formed in such manner that after the mirror has been subjected to the CASS Test for 250 hours, the said factor of luminous reflection is at least 0.98 times what it was before the mirror was subjected to that test. Mirrors satisfying one or both of these tests have even better aging properties.

The actual solution used for chemical deposition of the copper layer, the coppering solution, is not critical. A variety of commercially available solutions is known for depositing a protective copper layer on a reflective layer of silver. Examples of such solutions are set out in U.S. Pat. Specification No. 3,963,842. Such solutions may with advantage be used for depositing a reflective copper layer in accordance with this invention.

Deposition of a coating of high quality can be promoted by performing certain preliminary treatments to the surface to be coated. One such preferred treatment, known per se, is to give the surface to be coppered a preliminary treatment with silver nitrate. Such a treatment is found to activate the surface and prepare it for receiving the layer of copper. Such a solution need not be a concentrated solution, indeed the use of an aqueous solution containing about 5 mg/L silver nitrate is recommended. Advantageously such preliminary treatment consists in spraying the surface to be coppered with water, then with silver nitrate solution and then again with water. This is found to be a most effective treatment.

Preferably, prior to such silver nitrate treatment, the surface to be coppered is treated with a solution of stannous chloride. Such a pretreatment, which is also known per se, renders the silver nitrate treatment particularly efficacious. The stannous chloride solution also does not need to be concentrated, and an aqueous solution containing stannous chloride in an amount of about 20 mg/L is recommended.

Where the glass to be treated to form a mirror has a rather high content of alkali metal ions, as is the case for example with ordinary soda-lime glass which usually contains about 12% to 14% sodium calculated as sodium oxide, it is well known that the surface of the glass is subject to hydrolysis by atmospheric moisture. This tends to make the glass surface unsuitable for the receipt of a reflective layer of copper. Indeed, we have found that a delay of as little as three or four days between manufacture of soda-lime sheet glass and the application thereto of a reflective layer may have an adverse effect on the quality of the mirror produced. In order to alleviate this disadvantage, some embodiments of the invention provide that soda-lime glass on which the reflective copper layer is to be deposited is subjected to a dealkalising treatment in order to reduce the alkali metal ion population at its surface. In other preferred embodiments, the glass sheet is a sheet of soda-lime glass which is polished to provide a fresh glass surface for the reception of the copper layer.

The invention extends to a mirror which has been manufactured by a method as hereinbefore defined.

In FIG. 1, glass sheets are transported along a path 1 by conveyor rolls 2. The sheets travel from left to right in the drawing. The sheets pass first under polishers such as 3, comprising orbiting pads supplied with a mixture of cerium oxide and calcium carbonate powders in order to polish the glass to provide a fresh surface for the reception of the copper layer. This step may be omitted if the surface of the glass is poor in alkali metal ions.

The polishing step is followed by spraying with demineralised water from spray station 4, by a brushing treatment using rotary brush 5, and a further water spray from spray station 6 in order to clean the surface and remove all traces of the polishing powder.

A dilute solution of stannous chloride is then sprayed against the glass from spray station 7 to prepare the sheets for a following treatment. This solution may for example contain 20 mg/L stannous chloride. The solution may optionally be acidic.

The sheets then pass beneath successive spraying stations 8, 9 and 10 where the glass is sprayed respectively with demineralised water, with dilute silver nitrate solution, and again with demineralised water. This solution may contain 5 mg/L silver nitrate, and its purpose is to activate the surface of the glass for the reception of the copper layer.

The thus activated glass sheets then pass to a coppering zone represented by spray stations 11 to 18.

Three successive spray stations 11, 12 and 13 are provided for spraying a coating reaction product sequestering solution. The zones of impingement of the coating reaction product sequestering solution on the glass are contiguous. A suitable coating reaction product sequestering solution is a solution containing an ammonium compound, preferably one having a pH of about 11. The glass sheets next pass beneath spray stations 14 and 15 respectively spraying a solution containing copper and an activator which reacts with the copper containing solution to cause metallic copper to be deposited on the glass. A conventional coppering solution and activator may be used.

It is important that the common zone of impingement of the coppering solutions sprayed from the spray stations 14 and 15 should closely follow the zone of impingement of the coating reaction product sequestering solution on the glass so that the coating reactions take place in the presence of the sequestering solution, and that that common zone of impingement should itself be closely followed by a zone of impingement of jets of water sprayed from spray stations 16, 17 and 18. Excess coppering solution is flushed from the glass surface early in the water spray impingement zone.

It is found that a copperin station arranged and operating in this way is most effective for depositing a high quality copper layer which has a very low oxygen content. The use of a solution containing an ammonium compound also assists in rendering any products of the coppering reactions harmless to the glass and the copper layer deposited.

The coppered glass sheets then pass beneath air blowers such as 19, which act to dry the deposited copper layer for a following azole protection treatment, performed by spraying an appropriate azole solution from spray station 20. Excess azole solution and reaction products are then washed off by spraying demineralised water from spray station 21, and the azole protected coppered glass is again dried, by hot air blower 22, prior to the application of a protective paint layer sprayed from spray station 23.

If it is desired to apply a protective layer in some other way, for example by bonding the coppered sheet to another sheet to form a laminate, the painting step may be omitted.

Each spray station may comprise a plurality of stationary spray guns arranged to give uniform spray coverage across the full width of the glass path 1, but it is generally more convenient to make use of reciprocating spray guns.

EXAMPLE 1

Sheets of soda-lime glass 6 mm thick manufactured by the float process and measuring 3.2 m by 1.8 m are conveyed at a speed of 1.5 m/min through a mirror coating apparatus such as that just described.

The sheets are polished in a conventional manner using cerium oxide powder, rinsed and brushed, and treated with stannous chloride and silver nitrate as described above.

The sheets then pass through the coppering zone where they are sprayed with a solution containing an ammonium compound having a pH of between 10 and 11 from spray stations 11 to 13, with a conventional coppering solution and activator from spray stations 14 and 15, and with demineralised water from spray stations 16 to 18. The flow rate and concentration of the coppering solution and activator are arranged for forming a copper layer containing 700 mg/m$^2$ copper. Each spray station 11 to 18 in the coppering zone comprises a single spray gun, and these are ganged together and arranged for synchronous reciprocation across the path of the glass at a rate of 14 cycles per minute.

The mirror-coated sheets then pass through an azole spraying station 20.

In this Example, aminotetrazole is sprayed onto the copper coating at ambient temperature, the glass is warmed, and more aminotetrazole is sprayed on at a temperature of between 50° C. and 70° C. The solution used is aqueous containing aminotetrazole. After a dweel time of 2 to 3 minutes, the glass passes beneath wash spray station 21, whereafter the azole protected copper layer is dried and coated with an alkyl paint layer about 40 μm thick.

The properties of the resulting mirror were then measured. The proportion of light reflected by the mirror at various wavelengths (including ultravoilet light and infra-red light) was monitored and is represented as a percentage of incident light in the graph of FIG. 2.

Figure 2:
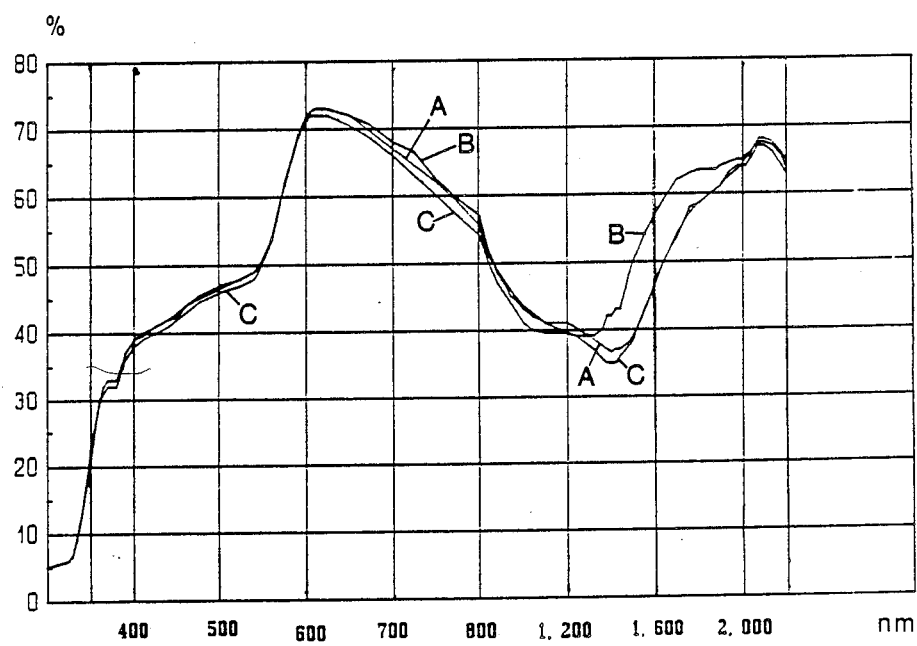
FIG. 2 is a graph showing the reflectivity of a mirror formed in accordance with the invention at various wavelengths, as freshly formed and after subjection to the CASS Test.
Figure 3:
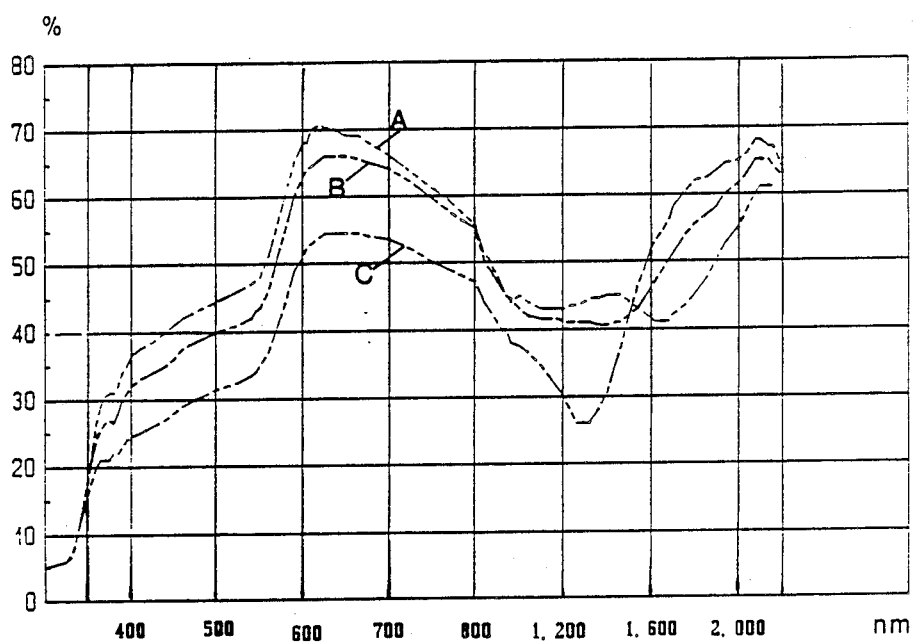
FIG. 3 is a similar graph in respect of an otherwise similar mirror which has not been subjected to an azole protection treatment.

In FIG. 2, Curve A represents the reflective property of the mirror as just formed. Curve B represents the reflective property after the mirror had been stored at 100° C. for 24 hours, and Curve C represents the reflective property after the mirror has been subjected to the CASS Test (ISO 3770-1976) for 120 hours. It will be noted that there is very little difference between these curves throughout the visible spectrum. This may be contrasted with the curves shown in FIG. 3 where corresponding reference letters are used to designate corresponding curves. The curves shown in FIG. 3 are plotted in respect of a mirror which was made in exactly the same way, save that the azole protection step was omitted. It will be noted that there is a considerable deterioration in the reflectivity of this mirror throughout the visible spectrum. If a mirror is made as in Example 1, but without spraying any ammonium compound from the spray stations 11 to 13, and without azole, even worse results are obtained.

Reflectivities of these three mirrors at 550 nm are given in the following Table 1:

TABLE 1

|  | as formed | after 24h at 100° C. | after 120h CASS Test |
|---|---|---|---|
| Example 1 | 51% | 51% | 50.5% |

TABLE 1-continued

|  | as formed | after 24h at 100° C. | after 120h CASS Test |
|---|---|---|---|
| Ammonium, no azole | 48% | 44% | 35% |
| No ammonium or azole | 47%* | 42% | 33% |

Various other properties of these three mirrors are given in the following Table 2, in which:

RL represents the factor of luminous reflection expressed as a percentage of incident visible light (C.I.E. Illuminant C);

RE represents the factor of total energy reflection expressed as a percentage of incident radiation;

X and Y are colour co-ordinates on the C.I.E. colour diagram for light reflected by the mirrors;

Lambda (L) is the dominant wavelength in nanometers of the light reflected by the mirrors;

P is the colour purity of the light reflected by the mirrors expressed as a percentage.

TABLE 2

|  | Example 1 as formed | after 120h CASS Test | Ammonium, no azole as formed | after 120h CASS Test |
|---|---|---|---|---|
| RL | 56.40 | 56.0 | 53.5 | 39.5 |
| RE | 52.40 | 52.00 | 50.8 | 41.5 |
| X | 0.3575 | 0.3588 | 0.3599 | 0.3685 |
| Y | 0.3381 | 0.3389 | 0.3395 | 0.3432 |
| L | 588.4 | 588.2 | 588.2 | 588.3 |
| P | 18.6 | 19.1 | 19.6 | 22.9 |
|  | No ammonium, no azole as formed | after 120h CASS Test | Azole, no ammonium as formed | after 120h CASS Test |
| RL | 52.5 | 37.9 | 54.6 | 47.5 |
| RE | 49.3 | 40.8 | 51.5 | 50.5 |
| X | 0.3600 | 0.3750 | 0.3590 | 0.3690 |
| Y | 0.3396 | 0.3486 | 0.3390 | 0.3450 |
| L | 588.1 | 587.3 | 588.2 | 588.0 |
| P | 19.7 | 26.1 | 19.1 | 20.5 |

*The values given in respect of the mirrors having coatings which are not formed in the presence of ammonium are not strictly "as formed", but rather values just prior to subjection of the mirrors to the CASS Test. In fact we have noted a change in the reflective properties of such mirrors after formation of the reflective coating, even in a short period before azole protection could be applied during manufacture.

After subjection to the CASS Test for 250 hours, the mirror of Example 1 had RL=55.4, and RE=51.5. In respect of the other three mirrors, values for these factors were not measurable because the reflection varied from place to place due to partial destruction of the copper layer.

These figures demonstrate that the mirror of Example 1 has excellent stability as regards the proportion of incident light and total energy which will be reflected, and also as regards the colour of the reflected light.

EXAMPLE 2

In a variant of Example 1, a solution of an ammonium compound having a pH of about 11 was sprayed only from the spray station 13 nearest the coppering spray station 14, and the coppering solutions concentration and spray rate were adjusted for forming a copper layer with a coverage of 800 mg copper per square meter. The copper layer was given protective azole treatment as specified in Example 1 of British patent specification No. 2,102,453. The resulting mirror had properties very similar to that of Example 1 above.

I claim:

1. A method of manufacturing a copper mirror, comprising:
   a. polishing a transparent sheet of soda-lime glass to provide a fresh glass surface;
   b. coating the transparent sheet of soda-lime glass after polishing with a sequestering solution comprising an ammonium compound, which sequestering solution sequesters reaction products of a coppering solution to be subsequently applied, to provide a wetted glass sheet;
   c. forming on the wetted glass sheet a copper reflective layer by chemical deposition from contact with a coppering solution while the wetted glass sheet is still wet following coating with the sequestering solution to thereby improve the copper mirror's resistance to aging; and
   d. coating the copper reflective layer with an azole protective layer effective to protect the copper reflective layer from corrosion by the atmosphere.

2. The method according to claim 1, further comprising the step of:
   rinsing the copper reflective layer with water before coating thereof with the azole protective layer.

3. The method according to claim 2, wherein coating, forming, and rinsing are accomplished by transporting the glass sheet past successive spraying stations where it is sprayed, respectively, with the sequestering solution, the coppering solution, and water, and wherein the sequestering solution, the coppering solution, and water being sprayed each impinges respectively on a zone of impingement, the zone of impingement of the sequestering solution being sprayed and the zone of impingement of the water being sprayed being separated by a distance, and wherein the zone of impingement of the coppering solution is substantially coextensive with said distance between the zone of impingement of the sequestering solution being sprayed and the zone of impingement of the water being sprayed.

4. The method according to claim 2, wherein the sequestering solution has a pH of at least 10.

5. A method of manufacturing a copper mirror, comprising:
   a. coating a transparent glass sheet with a sequestering solution comprising an ammonium compound, which sequestering solution sequesters reaction products of a coppering solution to be subsequently applied, to provide a wetted glass sheet;
   b. forming on the wetted glass sheet a copper reflective layer by chemical deposition from contact with a coppering solution while the wetted glass sheet is still wet following coating with the sequestering solution, to thereby improve the copper mirror's resistance to aging;
   c. rinsing the copper reflective layer with water; and
   d. coating the copper reflective layer with an azole protective layer effective to protect the copper reflective layer from corrosion by the atmosphere.

6. The method according to claim 5, wherein coating, forming, and rinsing are accomplished by transporting the glass sheet past successive spraying stations where it is sprayed, respectively, with the sequestering solution, the coppering solution, and water, and wherein the sequestering solution, the coppering solution, and water being sprayed each impinges respectively on a zone of impingement, the zone of impingement of the sequestering solution being sprayed and the zone of impingement of the water being sprayed being separated by a distance, and wherein the zone of impingement of the coppering solution is substantially coextensive with said distance between the zone of impingement of the sequestering solution being sprayed and the zone of impingement of the water being sprayed.

7. The method according to claim 5, wherein the transparent glass sheet is a sheet of soda-lime glass and wherein the method includes the further step of polishing the transparent glass sheet prior to coating same with sequestering solution to provide a fresh glass surface.

8. The method according to claim 5, wherein the sequestering solution has a pH of at least 10.

* * * * *